(12) United States Patent
Inai

(10) Patent No.: US 11,239,684 B2
(45) Date of Patent: Feb. 1, 2022

(54) ELECTRONIC DEVICE AND CONTROL METHOD

(71) Applicant: CANON KABUSHIKI KAISHA, Tokyo (JP)

(72) Inventor: Kento Inai, Zushi (JP)

(73) Assignee: Canon Kabushiki Kaisha, Tokyo (JP)

(*) Notice: Subject to any disclaimer, the term of this patent is extended or adjusted under 35 U.S.C. 154(b) by 50 days.

(21) Appl. No.: 16/583,079

(22) Filed: Sep. 25, 2019

(65) Prior Publication Data

US 2020/0106291 A1  Apr. 2, 2020

(30) Foreign Application Priority Data

Sep. 28, 2018 (JP) .............................. JP2018-185441

(51) Int. Cl.
*H02J 7/00* (2006.01)
*H02J 7/04* (2006.01)
*H01M 10/623* (2014.01)
*H01M 10/42* (2006.01)

(52) U.S. Cl.
CPC ............. *H02J 7/04* (2013.01); *H01M 10/425* (2013.01); *H01M 10/623* (2015.04); *H01M 10/4257* (2013.01); *H01M 2010/4278* (2013.01)

(58) Field of Classification Search
None
See application file for complete search history.

(56) References Cited

U.S. PATENT DOCUMENTS

| | | |
|---|---|---|
| 2005/0280397 A1 | 12/2005 | Iwamoto |
| 2013/0113417 A1 | 5/2013 | Nakashima |
| 2015/0329007 A1* | 11/2015 | Matsunaga ............. B60L 50/13 320/126 |
| 2016/0126757 A1 | 5/2016 | Hirosawa |
| 2017/0063150 A1* | 3/2017 | Sakamoto ........... H01M 10/425 |
| 2018/0039310 A1 | 2/2018 | Oga |
| 2018/0205253 A1* | 7/2018 | Kwak .................... H02J 7/0032 |
| 2018/0233943 A1* | 8/2018 | Koizumi ............... H02J 7/1423 |
| 2019/0006722 A1* | 1/2019 | Kim ...................... H02J 7/0026 |

FOREIGN PATENT DOCUMENTS

JP  2013-102625 A  5/2013

* cited by examiner

*Primary Examiner* — Arun C Williams
(74) *Attorney, Agent, or Firm* — Canon U.S.A., Inc. I.P. Division

(57) ABSTRACT

An electronic device includes a first connection unit, a second connection unit, and a control unit. The control unit determines whether a first external device is connected to the first connection unit, and controls the electronic device to prevent charging of a battery connected to the first external device with power supplied from a second external device connected to the second connection unit, in a case where the first external device is connected to the first connection unit.

18 Claims, 11 Drawing Sheets

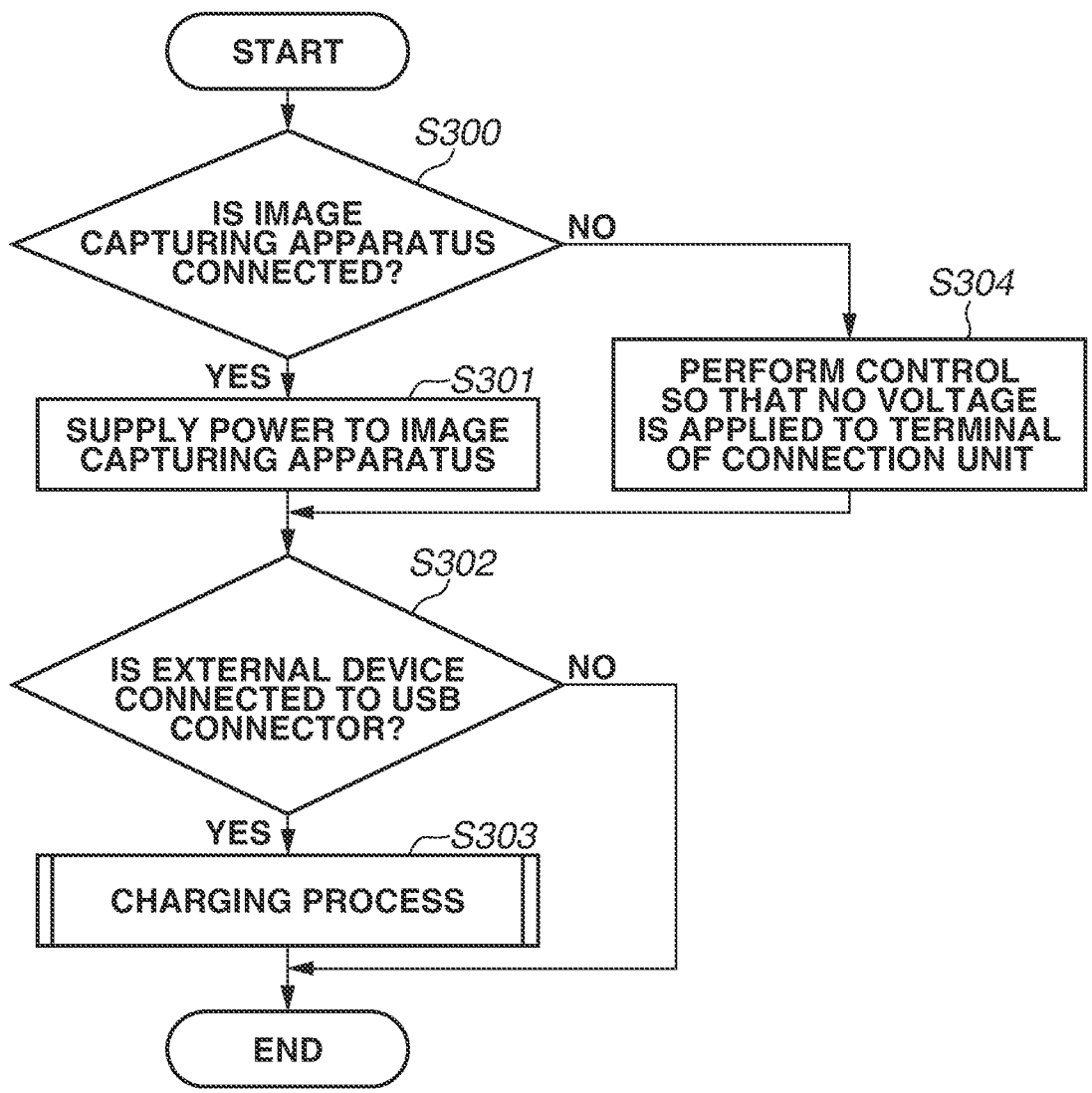

*112a,112b*

*112a,112b*

*112a,112b*

*112a,112b*

*112a,112b*

*112a,112b*

*112a,112b*

ELECTRONIC DEVICE AND CONTROL METHOD

BACKGROUND

Field of the Disclosure

Aspects of the disclosure generally relate to an electronic device, a control method, and a program.

Description of the Related Art

Electronic devices (such as a digital camera) having a connection unit compliant with a Universal Serial Bus (USB) standard have been introduced commercially. As an example of an accessory for a digital camera, a battery grip is known. A battery grip is capable of being connected to one or more batteries, and may also include a shutter button through which the camera can be operated.

Japanese Patent Application Laid-Open No. 2013-102625 discusses a method for charging a battery or batteries connected to an accessory. In a digital camera discussed in Japanese Patent Application Laid-Open No. 2013-102625, power via a USB cable connected to the digital camera is supplied to the battery or batteries of an accessory connected to the digital camera via the digital camera. The battery or batteries of the accessory is/are thereby charged.

The digital camera discussed in Japanese Patent Application Laid-Open No. 2013-102625 supplies power via the USB cable connected to the digital camera to the battery or batteries of the accessory connected to the digital camera. The battery or batteries of the accessory is/are thus powered via the digital camera. This increases the length of the power supply path from a power source to the battery of the accessory through the digital camera, and also increases the resistive component of the power supply path. Therefore, the charging efficiency drops accordingly. Such an issue can also occur with electronic devices other than a digital camera.

SUMMARY

According to an aspect of the embodiments, an electronic device having an improved power supply path and a method for controlling the same are provided.

According to an aspect of the embodiments, an electronic device comprising: a first connection unit; a second connection unit; and a control unit that determines whether a first external device is connected to the first connection unit, and controls the electronic device to prevent charging of a battery connected to the first external device with power supplied from a second external device connected to the second connection unit, in a case where the first external device is connected to the first connection unit.

According to an aspect of the embodiments, a method of controlling an electronic device including a first connection unit and a second connection unit, the method comprising: determining whether a first external device is connected to the first connection unit; and controlling the electronic device to prevent charging of a battery connected to the first external device with power supplied from a second external device connected to the second connection unit, in a case where the first external device is connected to the first connection unit.

According to an aspect of the embodiments, a non-transitory storage medium storing a program for causing a computer to perform a method of controlling an electronic device including a first connection unit and a second connection unit, the method comprising: determining whether a first external device is connected to the first connection unit; and controlling the electronic device to prevent charging of a battery connected to the first external device with power supplied from a second external device connected to the second connection unit, in a case where the first external device is connected to the first connection unit.

Further aspects of the embodiments will become apparent from the following embodiments.

BRIEF DESCRIPTION OF THE DRAWINGS

FIG. 5A is a flowchart illustrating an example of a control process of the battery grip 200.

DESCRIPTION OF THE EMBODIMENTS

Exemplary embodiments, features, and aspects of the disclosure will be described below with reference to the drawings. However, aspects of the disclosure are not limited to the following exemplary embodiments.

First Exemplary Embodiment

Figure 1A:
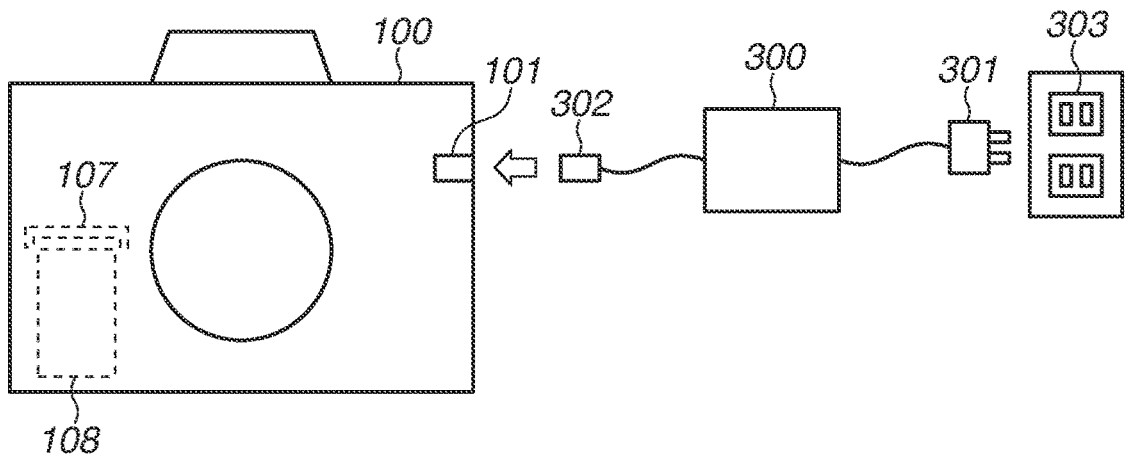
FIG. 1A is a diagram illustrating an example of a connection between an image capturing apparatus 100 and an adaptor 300.

An image capturing apparatus 100 and an adaptor 300 will be described with reference to FIG. 1A. FIG. 1A is a diagram illustrating an example of a connection between the image capturing apparatus 100 and the adaptor 300. In the following first and other exemplary embodiments, exemplary embodiments using a Universal Serial Bus (USB) standard will be described. The USB standard used in the first and other exemplary embodiments includes at least one of USB 2.0, USB 3.1, USB Type-C, and USB Power Delivery standards.

The image capturing apparatus 100 includes a battery holder 107 to which a battery 108 can be connected. The battery 108 is a battery such as a lithium ion battery, and is rechargeable. Both the image capturing apparatus 100 and the adaptor 300 are electronic devices.

The image capturing apparatus 100 includes a USB connector 101. With the adaptor 300 connected to the USB connector 101, power can be supplied to the image capturing apparatus 100 and the battery 108 can be charged by using a surplus of the power supplied.

The adaptor 300 includes a USB connector 302 and an alternating-current (AC) plug 301. The USB connector 302 is a connector that can be inserted into the USB connector 101 which is a receptacle. The AC plug 301 is connected to a commercial power source 303. The adaptor 300 converts power supplied from the commercial power source 303 into a direct-current (DC) power supply inside, and supplies the DC power supply from the USB connector 302 to the image capturing apparatus 100. The image capturing apparatus 100 can detect a supply voltage and supply current of the adaptor 300 from a voltage level of a communication line or via data communication.

Figure 1B:
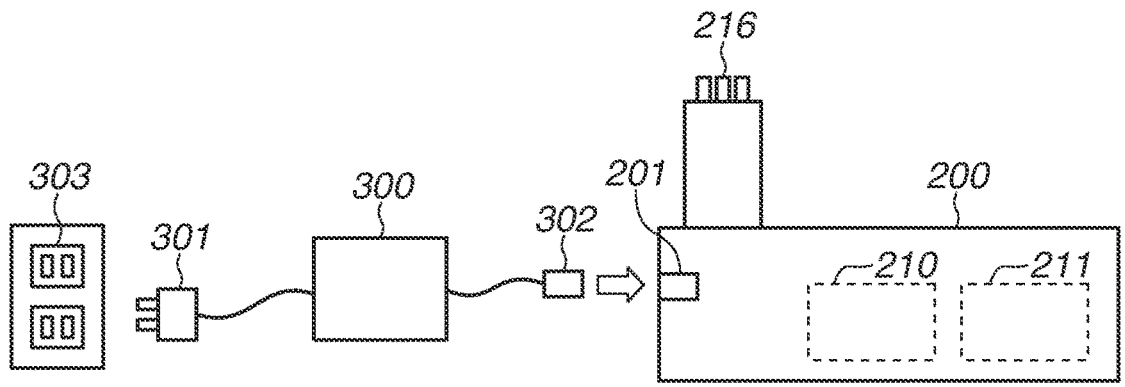
FIG. 1B is a diagram illustrating an example of a connection between a battery grip 200 and the adaptor 300.
Figure 1C:
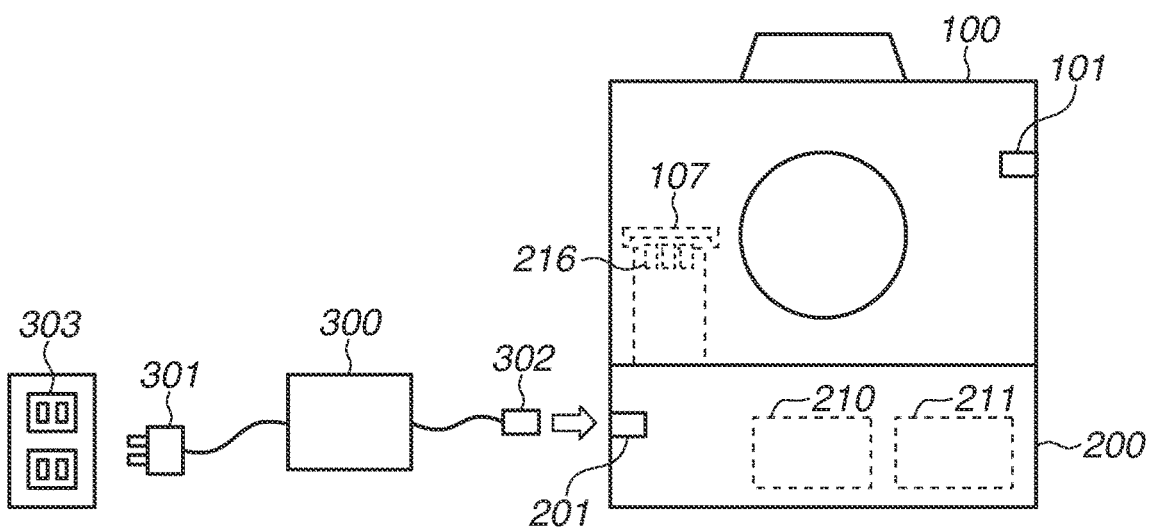
FIG. 1C is a diagram illustrating an example of a connection between the image capturing apparatus 100 and the battery grip 200.

Next, a battery grip 200 and the adaptor 300 will be described with reference to FIGS. 1B and 1C. FIG. 1B is a diagram illustrating an example of a connection between the battery grip 200 and the adaptor 300. FIG. 1C is a diagram illustrating an example of a connection between the image capturing apparatus 100 and the battery grip 200.

Figure 3A:
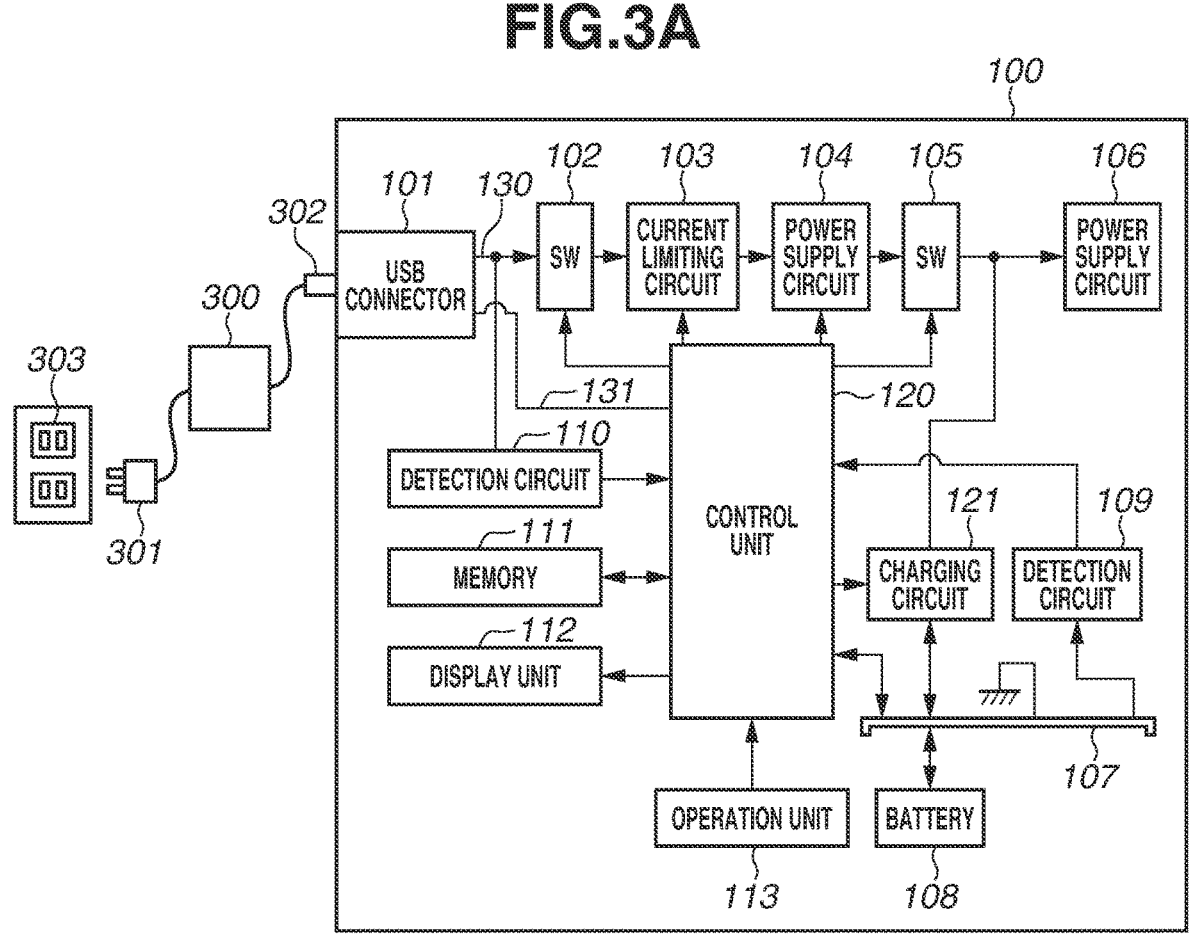
FIG. 3A is a diagram illustrating an example of a hardware configuration of the image capturing apparatus 100.
Figure 3B:
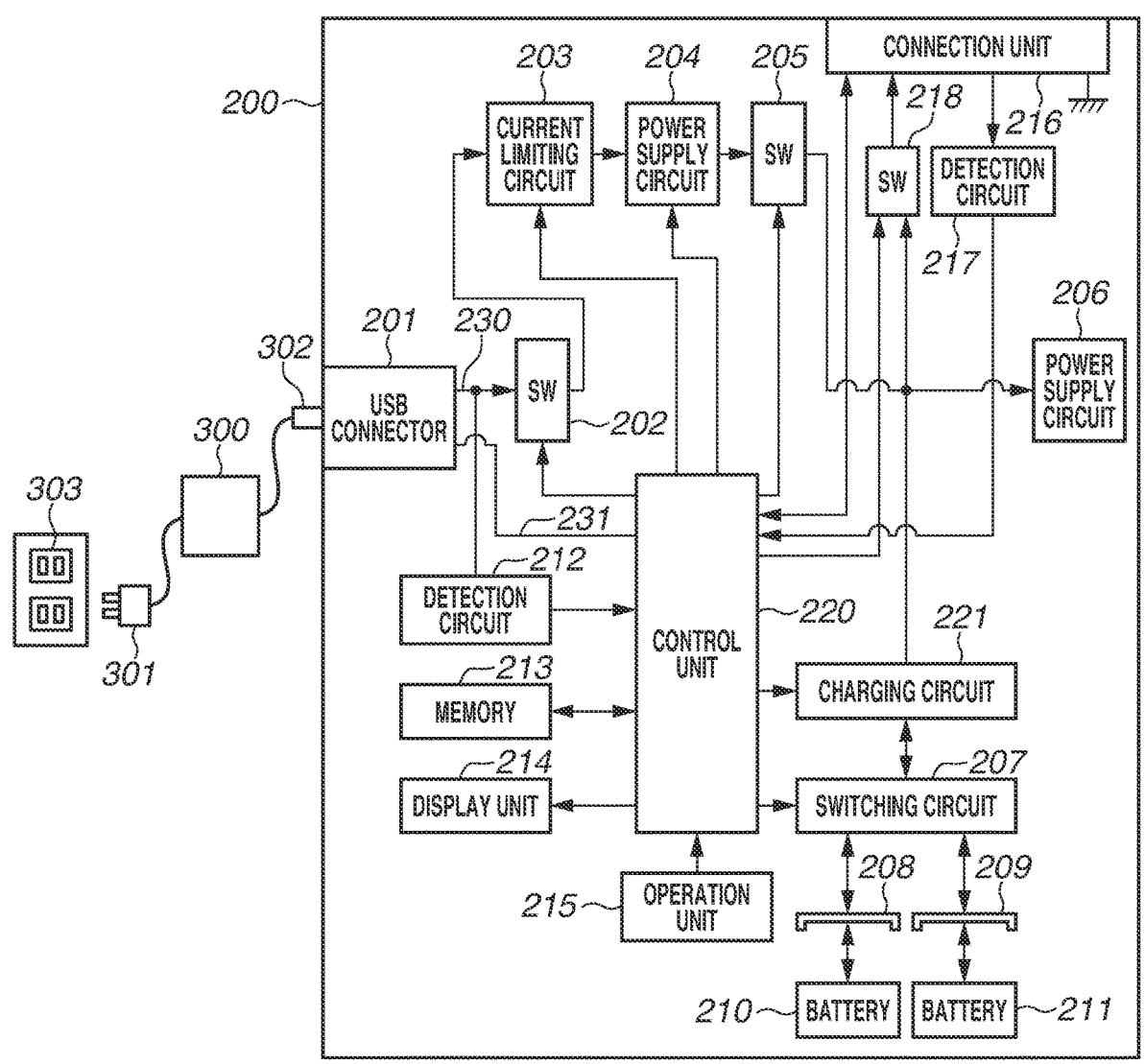
FIG. 3B is a diagram illustrating an example of a hardware configuration of the battery grip 200.

As illustrated in FIG. 1C, the battery grip 200 is an accessory of the image capturing apparatus 100 and can be connected to a lower part of the image capturing apparatus 100. As illustrated in FIG. 3B, the battery grip 200 includes an operation unit 215 such as a shutter button. In capturing an image of a human figure, a user can rotate the image capturing apparatus 100 by 90° for photographing in a vertical position. With the battery grip 200 connected to the image capturing apparatus 100, the user who performs photographing in a vertical position can grip the battery grip 200 and operate the operation unit 215 of the battery grip 200 to capture an image in a natural posture.

The battery grip 200 includes a USB connector 201. Batteries 210 and 211 connected to the battery grip 200 can be charged by connecting the adaptor 300 to the USB connector 201.

The battery grip 200 can be connected to the image capturing apparatus 100 via a connection unit 216. Power from the batteries 210 and 211 is supplied to the image capturing apparatus 100 via the connection unit 216.

As illustrated in FIG. 1C, the user can connect the connection unit 216 of the battery grip 200 to the battery holder 107 of the image capturing apparatus 100 instead of the battery 108. The user connects the battery holder 107 and the connection unit 216. The image capturing apparatus 100 and the battery grip 200 are thereby connected. The connection of the image capturing apparatus 100 and the battery grip 200 enables the image capturing apparatus 100 to be powered by the batteries 210 and 211 connected to the battery grip 200.

To charge the batteries 210 and 211 while the image capturing apparatus 100 and the battery grip 200 are connected to each other, the user connects the adaptor 300 to the USB connector 201. This corresponds to the case in which the batteries 210 and 211 are charged with the battery grip 200 alone. If the adaptor 300 is connected to the image capturing apparatus 100 while the image capturing apparatus 100 and the battery grip 200 are connected to each other, the batteries 210 and 211 are not charged with power supplied from the adaptor 300 connected to the image capturing apparatus 100.

There are two reasons for this.

First, charging the batteries 210 and 211 with both power supplied from the adaptor 300 connected to the battery grip 200 and power supplied from the adaptor 300 connected to the image capturing apparatus 100 complicates the circuitry and complicates firmware control.

Secondly, in charging the batteries 210 and 211 with power supplied from the adaptor 300 connected to the image capturing apparatus 100, the power from the adaptor 300 is supplied to the batteries 210 and 211 through the circuits of the image capturing apparatus 100 and the battery grip 200. There are mechanical contacts such as where the battery holder 107 and the connection unit 216 contact. This increases the length of the charging path and increases the resistive component of the charging path, compared to when the batteries 210 and 211 are charged with the power supplied from the adaptor 300 connected to the battery grip 200. There are also concerns about lower charging efficiency, such as an increased charging time. According to the present exemplary embodiment, if the image capturing apparatus 100 and the adaptor 300 are connected, the batteries 210 and 211 of the battery grip 200 are not charged with the power supplied from the adaptor 300 connected to the image capturing apparatus 100.

In view of the foregoing, if the image capturing apparatus 100 and the battery grip 200 are connected, the batteries 210 and 211 of the battery grip 200 are charged by connecting the adaptor 300 to the USB connector 201 of the battery grip 200. Such a configuration can simplify the circuitry and the firmware control. The shorter charging path can reduce the resistive component for higher charging efficiency.

Figure 2A:
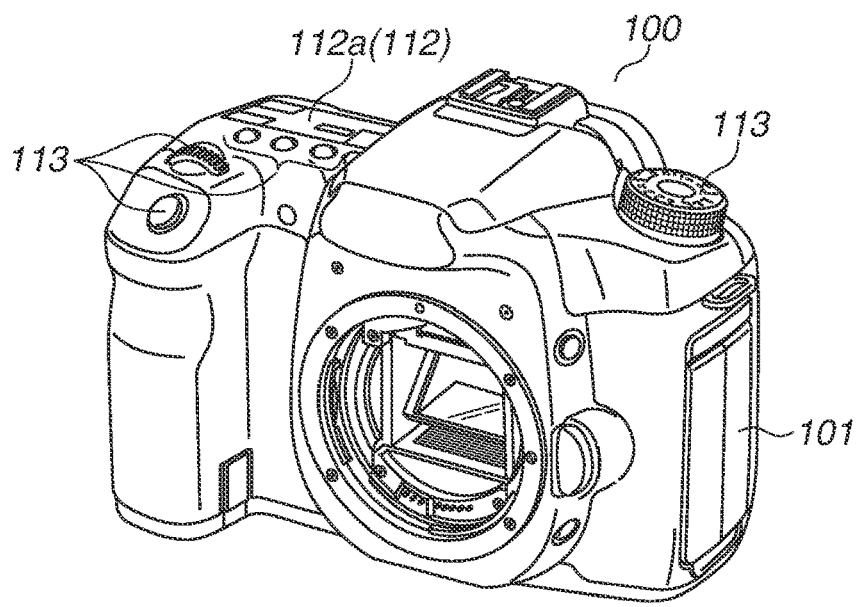
FIGS. 2A and 2B are perspective views illustrating an example of the appearance of the image capturing apparatus 100.
Figure 2B:
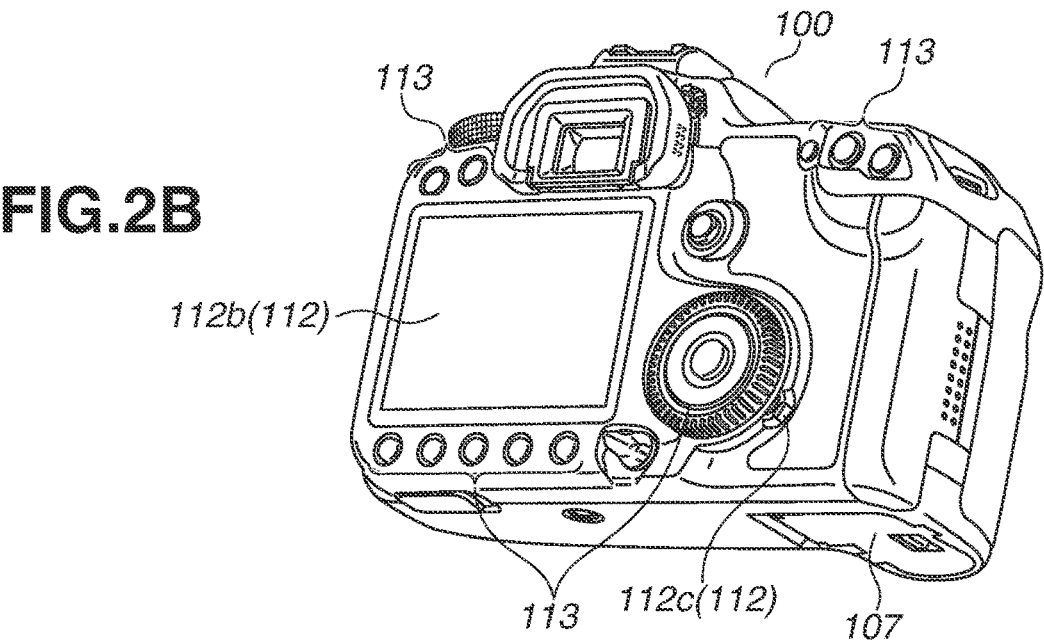

Next, a configuration of the image capturing apparatus 100 will be described with reference to FIGS. 2A, 2B, and 3A. FIG. 2A is a perspective view illustrating an example of the appearance of the image capturing apparatus 100 seen in a first direction. FIG. 2B is a perspective view illustrating an example of the appearance of the image capturing apparatus 100 seen in a direction opposite to the first direction. FIG. 3A is a diagram illustrating an example of a hardware configuration of the image capturing apparatus 100. FIG. 3A illustrates a state where the image capturing apparatus 100 and the adaptor 300 are connected.

The image capturing apparatus 100 includes the USB connector 101, a power switch 102, a current limiting circuit 103, a power supply circuit 104, a power switch 105, a power supply circuit 106, the battery holder 107, a detection circuit 109, a detection circuit 110, a memory 111, and a charging circuit 121. The image capturing apparatus 100 also includes a display unit 112, an operation unit 113, and a control unit 120.

The USB connector 101 is a USB interface of receptacle shape for connecting to a USB-capable external device. A power supply line 130, a signal line 131, and a ground (GND) are connected to the USB connector 101. The power supply line 130 is a VBUS line. The signal line 131 includes signal lines needed for USB communication. The power supply line 130 is connected to the power switch 102. The power from the power supply line 130 can be supplied to the battery 108 connected to the battery holder 107 via the current limiting circuit 103, the power supply circuit 104, the power switch 105, and the charging circuit 121. The power switch 102, the current limiting circuit 103, the power supply circuit 104, the power switch 105, and the charging circuit 121 are controlled by the control unit 120 to be described below. FIG. 3A illustrates the state where the adaptor 300 is connected to the USB connector 101. However, other devices (such as a mobile battery, a personal computer (PC), a smartphone, or a tablet) may be connected to the USB connector 101. In FIG. 2A, the USB connector 101 is protected by a cover. The USB connector 101 is an example of a second connection unit. The device connected to the USB connector 101 is an example of a second external device.

The power switch 102 is a switch for turning on/off the power supply from the power supply line 130. The control unit 120 turns off the power switch 102 if an excessive voltage is applied, whereby the excessive voltage is not applied to electronic components subsequent to the power switch 102. The electronic components subsequent to the power switch 102 refer to those connected to the opposite side of the power switch 102 from the USB connector 101. The control unit 120 may use the power switch 102 to cut off the power supply from the power supply line 130 if the battery grip 200 is connected to the image capturing apparatus 100.

The current limiting circuit 103 is a circuit for VBUS current limitation. For current limitation, the current limiting circuit 103 sets an upper limit of the magnitude of the current output from the current limiting circuit 103 to a predetermined current value. The predetermined current value for current limitation will be referred to as an upper limit current value of current limitation. The USB standard defines allowable power consumption depending on the connected device. The current limiting circuit 103 implements current limitation based on the connected device. The USB standard defines a low power consumption state called a suspend state. The image capturing apparatus 100 shifts to the low power consumption state if requested by a communication device, such as a PC. In the low power consumption state, the magnitude of the current output from the current limiting circuit 103 needs to be set to a predetermined current value or less that satisfies the suspend state defined by the USB standard. The predetermined current value satisfying the suspend state will be referred to as an upper limit current value of the suspend state. The image capturing apparatus 100 can support the suspend state by the current limiting circuit 103 performing current limitation. If the battery grip 200 is connected to the image capturing apparatus 100, the current limiting circuit 103 sets the upper limit current value of current limitation to the upper limit current value of the suspend state or less, for example. If the battery grip 200 is connected to the image capturing apparatus 100, electronic components of the image capturing apparatus 100 operates with power supplied from the battery grip 200.

The power supply circuit 104 includes a direct-current-to-direct-current (DCDC) converter for converting the VBUS voltage into a certain voltage.

The power switch 105 is a switch for supplying the power converted in voltage by the power supply circuit 104 to the battery 108 connected to the battery holder 107 and electronic components subsequent to the power switch 105. The image capturing apparatus 100 may not include the power switch 105.

The charging circuit 121 charges the battery 108 by controlling at least either one of a voltage and a current.

The battery holder 107 is a battery chamber for connecting the battery 108. The battery 108 can be connected to the battery holder 107. The battery grip 200 can also be connected to the battery holder 107, and the image capturing apparatus 100 can be powered by the batteries 210 and 211 connected to the battery grip 200. The battery holder 107 is an example of a first connection unit. The battery grip 200 connected to the battery holder 107 is an example of a first external device.

The detection circuit 109 is a circuit for detecting that the battery grip 200 is connected to the battery holder 107. The control unit 120 obtains a detection signal indicating the result of the detection made by the detection circuit 109, and detects that the battery grip 200 is connected to image capturing apparatus 100 based on the detection signal. For example, a terminal of the battery grip 200 to be fitted to the battery holder 107 and designed for the detection circuit 109 is grounded, and a terminal of the battery holder 107 designed for the detection circuit 109 is pulled up to a predetermined voltage. With this configuration, the detection circuit 109 can detect that the battery grip 200 is connected to the battery holder 107 based on the voltage of the terminal of the battery holder 107. The control unit 120 may pull up the voltage of the terminal of the battery holder 107 designed for the detection circuit 109 to the predetermined voltage in an intermittent manner.

The power supply circuit 106 generates power to be supplied to system circuits of the image capturing apparatus 100. The system circuits of the image capturing apparatus 100 control the entire image capturing apparatus 100 and implement an image capturing function. In charging the battery 108 by using the adaptor 300, the image capturing apparatus 100 receives the power supply from the adaptor 300 and operates the system circuits with the power supply circuit 106 while charging the battery 108 with surplus power.

The battery holder 107 is protected by a lid. The battery 108 or the battery grip 200 can be connected to the battery holder 107 with the lid open.

The detection circuit 110 is a circuit for detecting the VBUS voltage when a USB plug is connected to the USB connector 101. The control unit 120 obtains a detection signal indicating the result of the detection performed by the detection circuit 110, and detects that the adaptor 300 is connected to the image capturing apparatus 100 based on the detection signal.

The memory 111 includes a nonvolatile memory and a volatile memory. The memory 111 is used as a storage area for display data of the display unit 112 to be described below and as a storage area of the control unit 120 to be described below. The memory 111 is an example of a storage medium.

The display unit 112 displays the state of the battery 108 connected to the image capturing apparatus 100, an image captured by the image capturing apparatus 100, and an imaging mode. As illustrated in FIGS. 2A and 2B, the image capturing apparatus 100 includes a display unit 112a, a display unit 112b, and a display unit 112c as the display unit 112.

The display unit 112a is a liquid crystal display, and includes a segment liquid crystal panel or a dot matrix liquid crystal panel. The display unit 112a displays the state of the battery 108 connected to the image capturing apparatus 100, the imaging mode of the image capturing apparatus 100, and imaging settings.

The display unit 112b is a rear monitor, and includes a thin film transistor (TFT) liquid crystal panel or an organic electroluminescence (EL) panel. The display unit 112b displays a preview of a captured image, a live view (LV) image, the state of the battery 108 connected to the image capturing apparatus 100, the imaging mode of the image capturing apparatus 100, and imaging settings. The display unit 112b can also display cautions and warnings to the user.

The display unit 112c is a light emitting diode (LED) and used to indicate a state of charge and a card access. A user can distinguish the indication of the state of charge and the indication of a card access by LED color. For example, if the battery 108 is being charged, the control unit 120 turns on the LED in green. If the charging of the battery 108 is completed, the control unit 120 turns off the LED. If an error occurs during the charging of the battery 108, the control unit 120 blinks the LED in green to call for the user's attention. The lighting control of the LED described here is an example and not restrictive.

The operation unit 113 is used to receive imaging instructions, display a menu screen, and change the imaging mode. The operation unit 113 includes a switch, a dial, and a touch panel.

The control unit 120 is a microcomputer for controlling the charging and discharging of the battery 108 and performing communication with the battery grip 200 and the adaptor 300. The control unit 120 can communicate with a communication device, such as a PC connected to the USB connector 101. If the adaptor 300 is connected to the USB connector 101, the control unit 120 detects the connection of the adaptor 300 based on the detection signal from the detection circuit 110. The control unit 120 determines the type and supply capability of the adaptor 300 connected to the image capturing apparatus 100 based on signals from the signal line 131. The control unit 120 controls the power switch 102, the current limiting circuit 103, the power supply circuit 104, the power switch 105, and the charging circuit 121, and performs control for charging the battery 108. The control unit 120 implements processes of FIGS. 4A and 4B to be described below by executing a program stored in the memory 111.

Figure 2C:
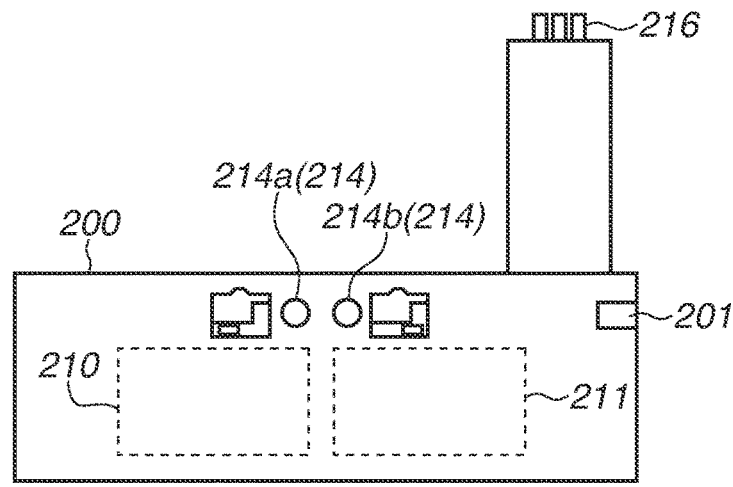
FIG. 2C is a diagram illustrating an example of the appearance of the battery grip 200.

Next, a configuration of the battery grip 200 will be described with reference to FIGS. 2C and 3B. FIG. 2C is a diagram illustrating an example of the appearance of the battery grip 200. FIG. 3B is a diagram illustrating an example of a hardware configuration of the battery grip 200. FIG. 3B illustrates a state where the battery grip 200 and the adaptor 300 are connected.

The battery grip 200 includes the USB connector 201, a switching circuit 207, a power switch 202, a current limiting circuit 203, a power supply circuit 204, a power switch 205, a power supply circuit 206, a charging circuit 221, the connection unit 216, and a detection circuit 217. The battery grip 200 also includes a power switch 218, a detection circuit 212, a memory 213, a display unit 214, the operation unit 215, and a control unit 220.

Like the USB connector 101 of the image capturing apparatus 100, the USB connector 201 is a USB interface of receptacle shape for connecting to a USB-capable external device. A power supply line 230, a signal line 231, and a GND are connected to the USB connector 201. The power supply line 230 is connected to the power switch 202. Power from the power supply line 230 can be supplied to the batteries 210 and 211 connected to the battery holders 208 and 209 via the current limiting circuit 203, the power supply circuit 204, the power switch 205, the charging circuit 221, and the switching circuit 207. The battery 210 can be connected to the battery holder 208. The battery 211 can be connected to the battery holder 209. The USB connector 201 is an example of a fourth connection unit. The device connected to the USB connector 201 is an example of a fourth external device.

The switching circuit 207 is a circuit for switching the connection of a power supply path between the batteries 210 and 211. The switching circuit 207 switches between a state where the battery 210 is connected to the power supply path and a state where the battery 211 is connected to the power supply path. The power supply path is a path through which power passes in charging or discharging the batteries 210 and 211.

The power switch 202, the current limiting circuit 203, the power supply circuit 204, the power switch 205, the power supply circuit 206, and the charging circuit 221 are controlled by the control unit 220 to be described below. Since such components have similar functions to those of the image capturing apparatus 100 described with reference to FIG. 3A, a description thereof will be omitted. The battery grip 200 may not include the power switch 205. FIG. 3B illustrates a state where the adaptor 300 is connected to the USB connector 201. Other devices (such as a mobile battery, a PC, a smartphone, or a tablet) may be connected to the USB connector 201.

The connection unit 216 connects to the image capturing apparatus 100. The connection unit 216 has a shape to fit to the battery holder 107 of the image capturing apparatus 100. The battery grip 200 supplies power from the battery 210 or 211 to the image capturing apparatus 100 via the connection unit 216. The connection unit 216 includes a communication line and a detection signal line.

The detection circuit 217 detects that the connection unit 216 is connected to the image capturing apparatus 100. The control unit 220 obtains a detection signal indicating the result of the detection made by the detection circuit 217, and detects that the image capturing apparatus 100 is connected to the battery grip 200 in accordance with the detection signal. For example, a terminal of the image capturing apparatus 100 to be fitted to the connection unit 216 and designed for the detection circuit 217 is grounded, and a terminal of the connection unit 216 designed for the detection circuit 217 is pulled up to a predetermined voltage. This allows the detection circuit 217 to detect that the image capturing apparatus 100 is connected to the connection unit 216 based on the voltage of the terminal of the connection unit 216. The control unit 220 may pull up the voltage of the terminal of the connection unit 216 designed for the detection circuit 217 to the predetermined voltage in an intermittent manner. The connection unit 216 is an example of a third connection unit. The image capturing apparatus 100 connected to the connection unit 216 is an example of a third external device.

By switching the power switch 218, whether the power of the battery 210 or 211 is supplied to the image capturing apparatus 100 is changed. The power switch 218 is controlled by the control unit 220 to be described below. If the connection of the image capturing apparatus 100 is not detected by the detection circuit 217, the power switch 218 is turned off. This can prevent unwanted an unwanted voltage to being applied to the connection unit 216. The battery grip 200 may not need to include the power switch 218.

Like the detection circuit 110 of the image capturing apparatus 100, the detection circuit 212 detects a VBUS voltage when a USB plug is connected to the USB connector 201.

Like the memory ill of the image capturing apparatus 100, the memory 213 includes a nonvolatile memory and a volatile memory. The memory 213 is used as a storage area in which operation constants, variables, and a program of the control unit 220 to be described below are stored or loaded. The memory 213 is an example of a storage medium.

Like the display unit 112 of the image capturing apparatus 100, the display unit 214 displays the state of the batteries 210 and 211 connected to the battery grip 200. In the present exemplary embodiment, the display unit 214 includes inexpensive display members, such as an LED. As illustrated in FIG. 2C, the battery grip 200 includes a display unit 214*a* and a display unit 214*b* as the display unit 214. The display units 214*a* and 214*b* display the states of charge of the batteries 210 and 211 connected to the battery grip 200. For example, the display unit 214*a* displays the state of charge of the battery 210. The display unit 214*b* displays the state of charge of the battery 211. As an example, if the batteries 210 and 211 are being charged, the battery grip 200 turns on the LEDs in green. If the charging is completed, the battery grip 200 turns off the LEDs. If an error occurs during the charging of the batteries 210 and 211, the battery grip 200 blinks the LEDs in green to call for the user's attention. The lighting control of the LEDs described here is an example and not restrictive.

The control unit 220 is a microcomputer for controlling the charging and discharging of the batteries 210 and 211 and performing communication with the image capturing apparatus 100. The control unit 22*s* implements processes of FIGS. 5A and 5B to be described below by executing the program stored in the memory 213.

Figure 3C:
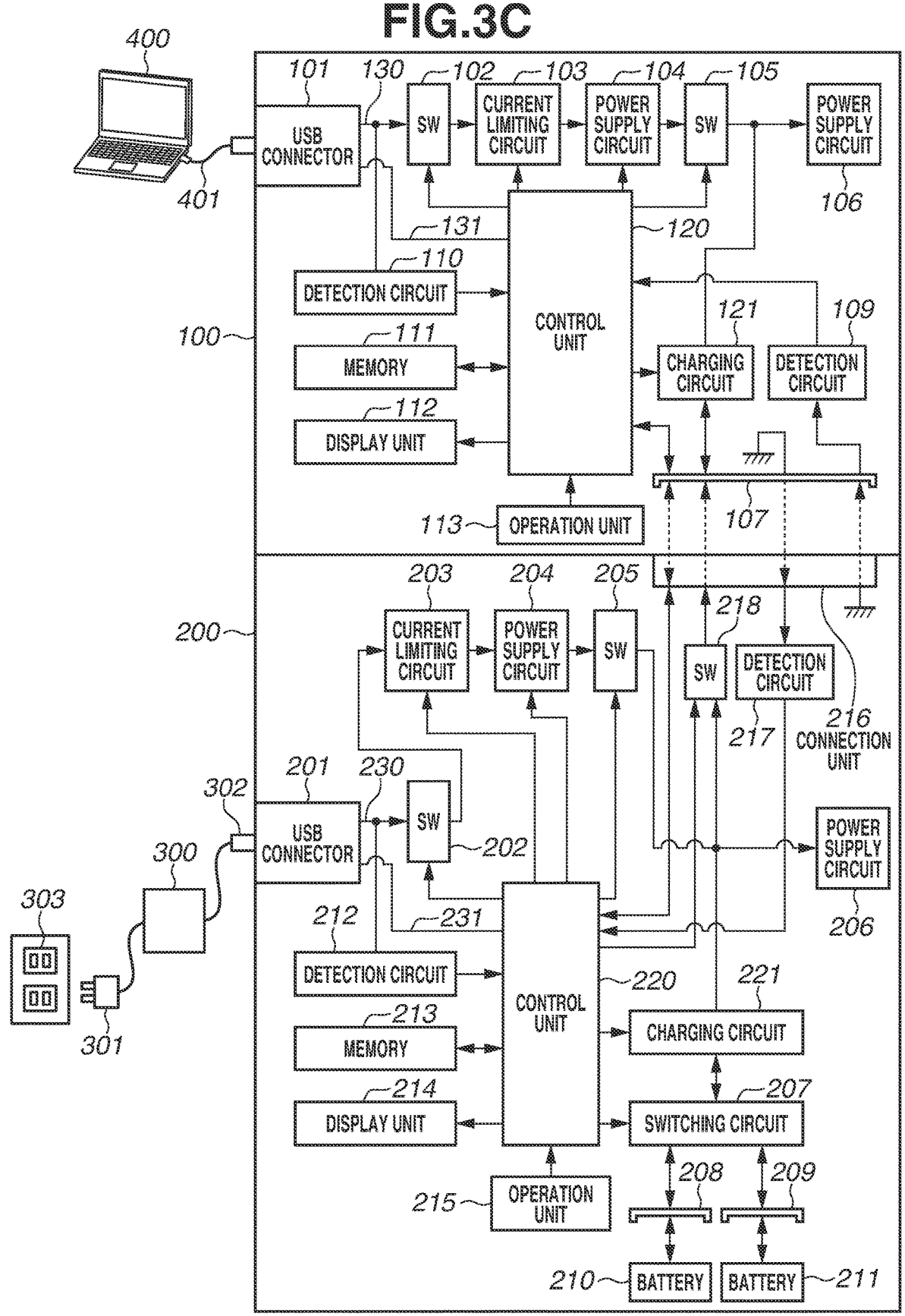
FIG. 3C is a diagram illustrating an example of a hardware configuration of the image capturing apparatus 100 and the battery grip 200.

Next, an operation in the case where the image capturing apparatus 100 and the battery grip 200 are connected will be described with reference to FIG. 3C. FIG. 3C is a diagram illustrating an example of a hardware configuration of the image capturing apparatus 100 and the battery grip 200. FIG. 3C illustrates a state where the image capturing apparatus 100 and the battery grip 200 are connected. FIG. 3C illustrates a state where a USB cable 401 of a PC 400 is connected to the USB connector 101 of the image capturing apparatus 100 and the PC 400 is thus connected to the USB connector 101 of the image capturing apparatus 100. FIG. 3C illustrates a state where the adaptor 300 is connected to the USB connector 201 of the battery grip 200. The AC plug 301 of the adaptor 300 is connected to the commercial power source 303. In the state of FIG. 3C, the image capturing apparatus 100 operates with power supplied from the battery grip 200.

If the connection of the battery grip 200 is detected based on the detection signal from the detection circuit 109, the control unit 120 of the image capturing apparatus 100 controls the current limiting circuit 103 to perform current limitation. For example, if the connection of the battery grip 200 is detected, the control unit 120 controls the current limiting circuit 103 in such a manner that the upper limit current value of current limitation becomes less than or equal to the upper limit current value of the suspend state. Alternatively, the control unit 120 may control the current limiting circuit 103 in such a manner that the current output from the current limiting circuit 103 becomes a predetermined low current. If the connection of the battery grip 200 is detected based on the detection signal from the detection circuit 109, the control unit 120 of the image capturing apparatus 100 may perform control to turn off the power switch 102. In such a manner, the control unit 120 limits the power supply from the device connected to the USB connector 101, and operates the image capturing apparatus 100 with the power supply from the batteries 210 and 211 of the battery grip 200.

If the connection of the image capturing apparatus 100 is detected based on the detection signal from the detection circuit 217, the control unit 220 of the battery grip 200 performs control to turn on the power switch 218 so that power is supplied to the image capturing apparatus 100. If the battery grip 200 does not include the power switch 218, the battery grip 200 starts to supply power to the image capturing apparatus 100 upon connection of the battery grip 200 and the image capturing apparatus 100.

If the adaptor 300 is connected to the USB connector 201, the control unit 220 charges the batteries 210 and 211 with power supplied from the adaptor 300. The control unit 220 controls displaying of the state of the batteries 210 and 211 connected to the battery grip 200 on the display unit 214 that includes the LEDs. In this process, the control unit 220 issues an instruction to display the state of the batteries 210 and 211 connected to the battery grip 200 on the display unit 112 of the image capturing apparatus 100 by transmitting a predetermined display request to the image capturing apparatus 100. The state of charge and an error state can thus be displayed on the display unit 112 of the image capturing apparatus 100. This configuration can provide a user-friendly display, compared to the case of when the state of charge and an error state are indicated by using only the display unit 214 that includes the LEDs.

As described above, in the state illustrated in FIG. 3C, the power for charging the batteries 210 and 211 of the battery grip 200 is supplied via the USB connector 201 of the battery grip 200. The USB connector 101 of the image capturing apparatus 100 is used only for USB data communication and does not serve as a supply path of the power for charging the batteries 210 and 211 of the battery grip 200. The supply path of the power for charging the batteries 210 and 211 of the battery grip 200 can thus be reduced in length, compared to the case in which the power for charging is supplied via the image capturing apparatus 100. This enables USB data communication while increasing the charging efficiency of the batteries 210 and 211 of the battery grip 200.

Figure 4A:
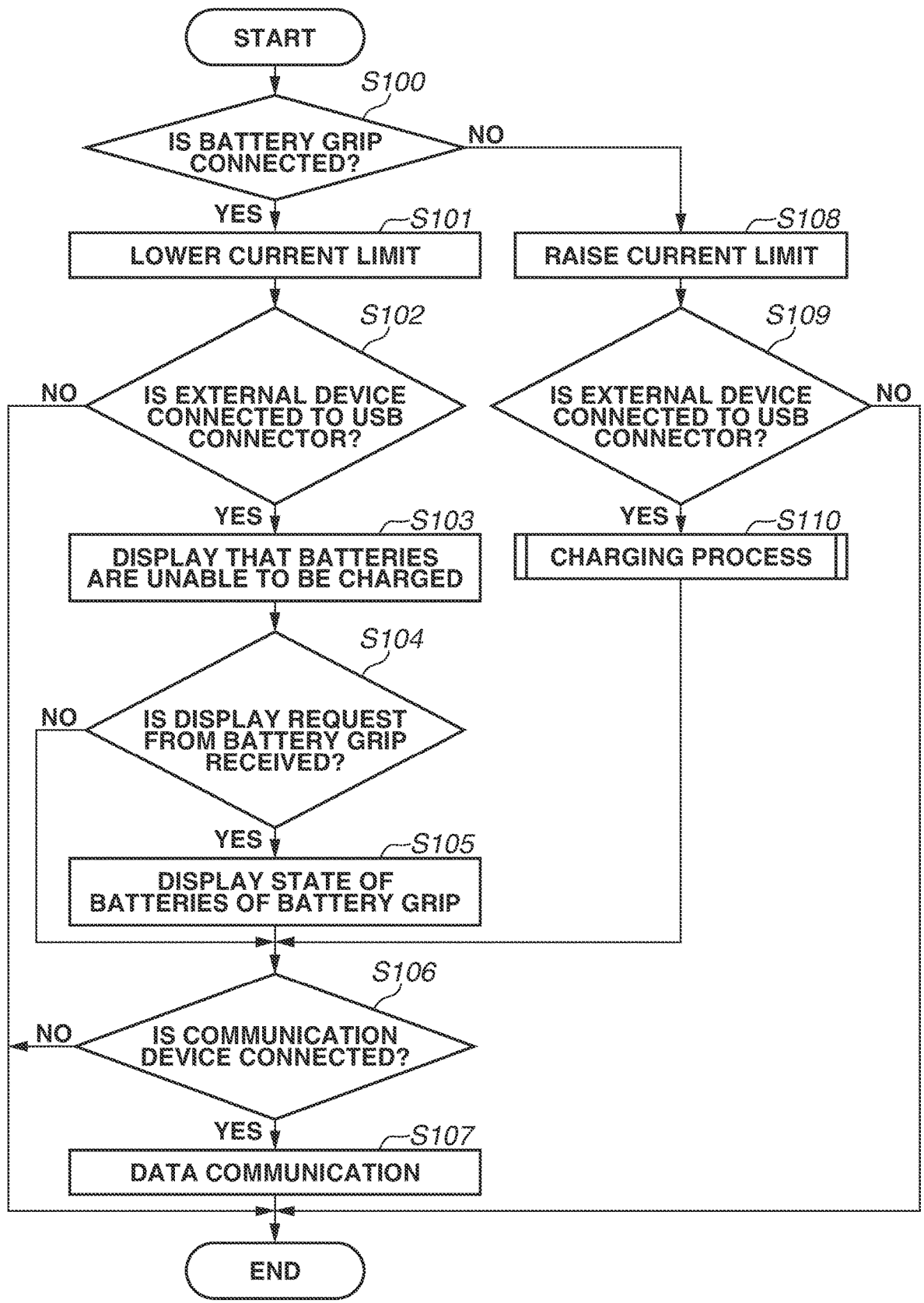
FIG. 4A is a flowchart illustrating an example of a control process of the image capturing apparatus 100.

Next, a control process of the image capturing apparatus 100 will be described with reference to FIG. 4A. FIG. 4A is a flowchart illustrating an example of the control process of the image capturing apparatus 100. The control process of the image capturing apparatus 100 includes processing in the case in which charging is performed with the image capturing apparatus 100 alone and processing in the case where the battery grip 200 is connected to the image capturing apparatus 100.

In step S100, the control unit 120 obtains the detection signal indicating the result of the detection made by the detection circuit 109, and determines whether the battery grip 200 is connected to the battery holder 107 of the image capturing apparatus 100 based on the detection signal. If the control unit 120 determines that the battery grip 200 is connected to the battery holder 107 of the image capturing apparatus 100 (YES in step S100), the processing proceeds to step S101. If the control unit 120 determines that the battery grip 200 is not connected to the battery holder 107 of the image capturing apparatus 100 (NO in step S100), the processing proceeds to step S108.

In step S101, the control unit 120 performs processing for lowering the current limit. For example, the control unit 120 controls the current limiting circuit 103 in such a manner that the upper limit current value of the current limitation becomes lower than or equal to the upper limit current value of the suspend state. As a result, the supply current flowing from the device connected to the USB connector 101 to the image capturing apparatus 100 satisfies the suspend state of USB. This prevents the image capturing apparatus 100 from charging the batteries 210 and 211 of the battery grip 200 with power supplied from the external device connected to the USB connector 101. The control unit 120 also controls the charging circuit 121 so that the image capturing apparatus 100 operates with power supplied from the battery grip 200. In step S101, the control unit 120 may control turning-off of the power switch 102 to cut off the supply current flowing from the device connected to the USB connector 101 to the image capturing apparatus 100. The power supplied from the external device connected to the USB connector 101 is therefore interrupted, and the image capturing apparatus 100 is prevented from charging the batteries 210 and 211 of the battery grip 200 with the power supplied from the external device connected to the USB connector 101.

In step S102, the control unit 120 determines whether an external device (such as the adaptor 300 or the PC 400) is connected to the USB connector 101 based on the detection signal from the detection circuit 110. If the control unit 120 determines that an external device is connected to the USB connector 101 (YES in step S102), the processing proceeds to step S103. If the control unit 120 determines that no external device is connected to the USB connector 101 (NO in step S102), the flowchart of FIG. 4A ends.

Figure 6A:
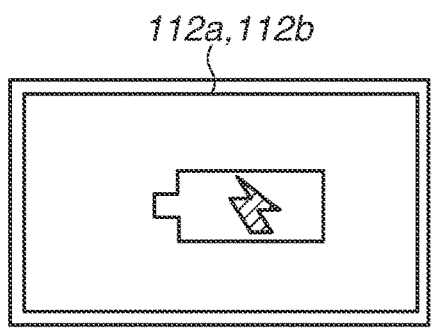
FIGS. 6A to 6G are diagrams each illustrating an example of a screen displayed by the image capturing apparatus 100.
Figure 6D:
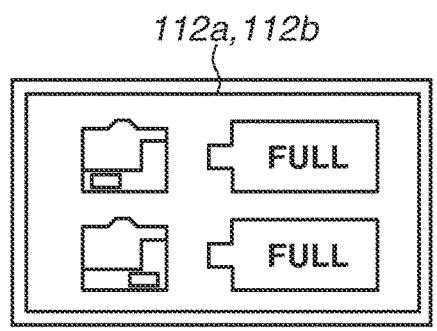
Figure 6B:
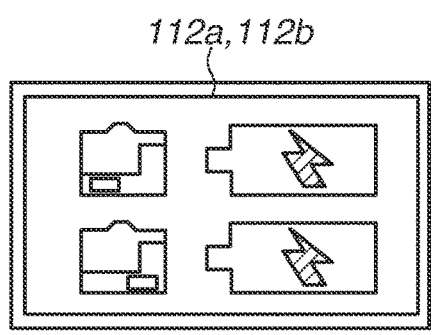
Figure 6E:
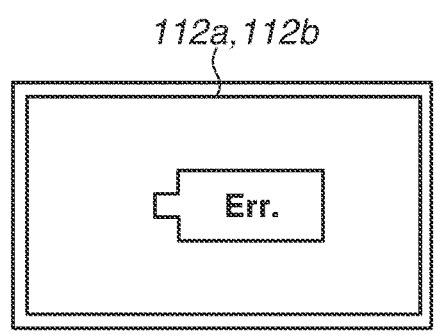
Figure 6C:
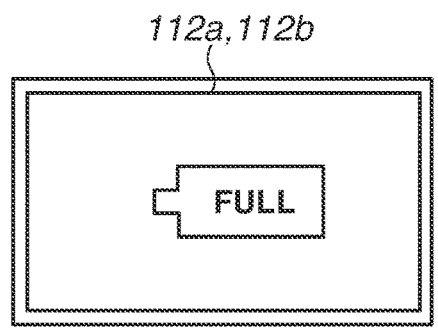
Figure 6F:
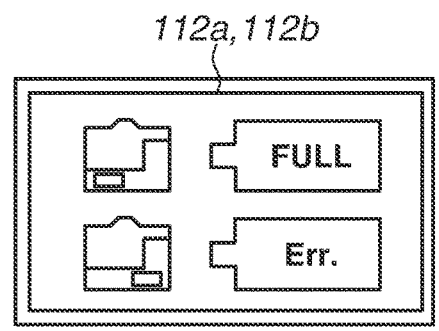
Figure 6G:
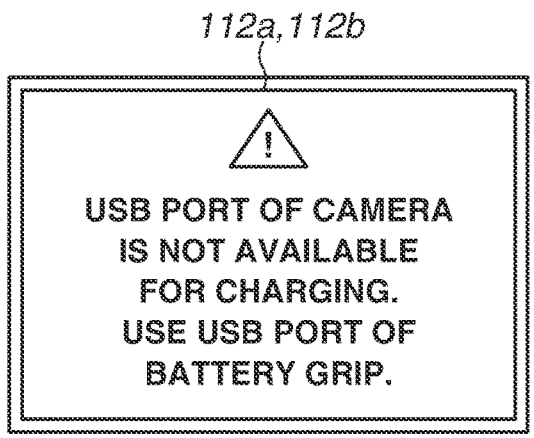

In step S103, the control unit 120 controls displaying of information about the charging of the battery grip 200 on at least either one of the display units 112a and 112b as illustrated in FIG. 6G. The information about the charging of the battery grip 200 includes that charging of the batteries 210 and 211 connected to the battery grip 200 via the USB connector 101 of the image capturing apparatus 100 are not available. The information about the charging of the battery grip 200 also includes that the USB connector 201 of the battery grip 200 needs to be used to charge the batteries 210 and 211 of the battery grip 200. The reason is that the charging of the battery grip 200 via the USB connector 101 of the image capturing apparatus 100 is not available, in the state where the image capturing apparatus 100 and the battery grip 200 are connected. The process of step S103 is an example of a third display control process by the image capturing apparatus 100.

In step S104, the control unit 120 determines whether a display request from the battery grip 200 is received via the battery holder 107. If the control unit 120 determines that the display request is received (YES in step S104), the processing proceeds to step S105. If the control unit 120 determines that no display request is received (NO in step S104), the processing proceeds to step S106. The display request is a request to display the state of charge or an error state of the batteries 210 and 211 connected to the battery grip 200 on the display unit 112 of the image capturing apparatus 100. Display examples of the charging state of the batteries 210 and 211 include the remaining levels of the batteries 210 and 211, whether the batteries 210 and 211 are being charged, and whether the charging of the batteries 210 and 211 is completed. Examples of the error state of the batteries 210 and 211 include whether there is a charging error.

In step S105, the control unit 120 controls displaying of the state of the batteries 210 and 211 connected to the battery grip 200 on the display unit 112, based on the display request received from the battery grip 200. The display unit 214 of the battery grip 200 includes simple display members, such as an LED, for the sake of cost reduction. By using the display unit 112 of the image capturing apparatus 100 in such a manner, a user-friendly display can thus be provided. The power for operating the image capturing apparatus 100, including the power needed for display, is supplied from the battery grip 200. The control unit 120 may controls displaying of the charging state of the batteries 210 and 211 on the display unit 112. The process of step S105 is an example of a first display control process by the image capturing apparatus 100.

In step S106, the control unit 120 determines whether a communication device capable of USB data communication is connected to the USB connector 101 based on the detection signal from the detection circuit 110. If the control unit 120 determines that a communication device is connected to the USB connector 101 (YES in step S106), the processing proceeds to step S107. If the control unit 120 determines that no communication device is connected to the USB connector 101 (NO in step S106), the flowchart of FIG. 4A ends. Examples of the communication device include the PC 400.

In step S107, the control unit 120 performs data communication with the communication device connected to the USB connector 101, such as the PC 400, by using the signal line 131. In step S107, the control unit 120 performs the data communication with the communication device, such as the PC 400, regardless of whether the battery grip 200 is connected to the battery holder 107 of the image capturing apparatus 100.

In step S108, the control unit 120 performs processing for raising the current limitation which is higher than the current limitation in step S101. For example, the control unit 120 controls the current limiting circuit 103 to set the upper limit current value of the current limitation higher than that of the suspend state. The control unit 120 defines the upper limit current value of the current limitation to satisfy the condition that if a device is connected to the USB connector 101, power needed for the operation of the image capturing apparatus 100 and the charging of the battery 108 can be supplied from the device. The control unit 120 determines the device connected to the USB connector 101, and performs control to set the current output from the current limiting circuit 103 to a value not exceeding the upper value of the current defined for the device by the USB standard.

In step S109, like step S102, the control unit 120 determines whether an external device (such as the adaptor 300 or the PC 400) is connected to the USB connector 101 based on the detection signal from the detection circuit 110. If the control unit 120 determines that an external device is connected to the USB connector 101 (YES in step S109), the processing proceeds to step S110. If the control unit 120 determines that no external device is connected to the USB connector 101 (NO in step S109), the flowchart of FIG. 4A ends.

Figure 4B:
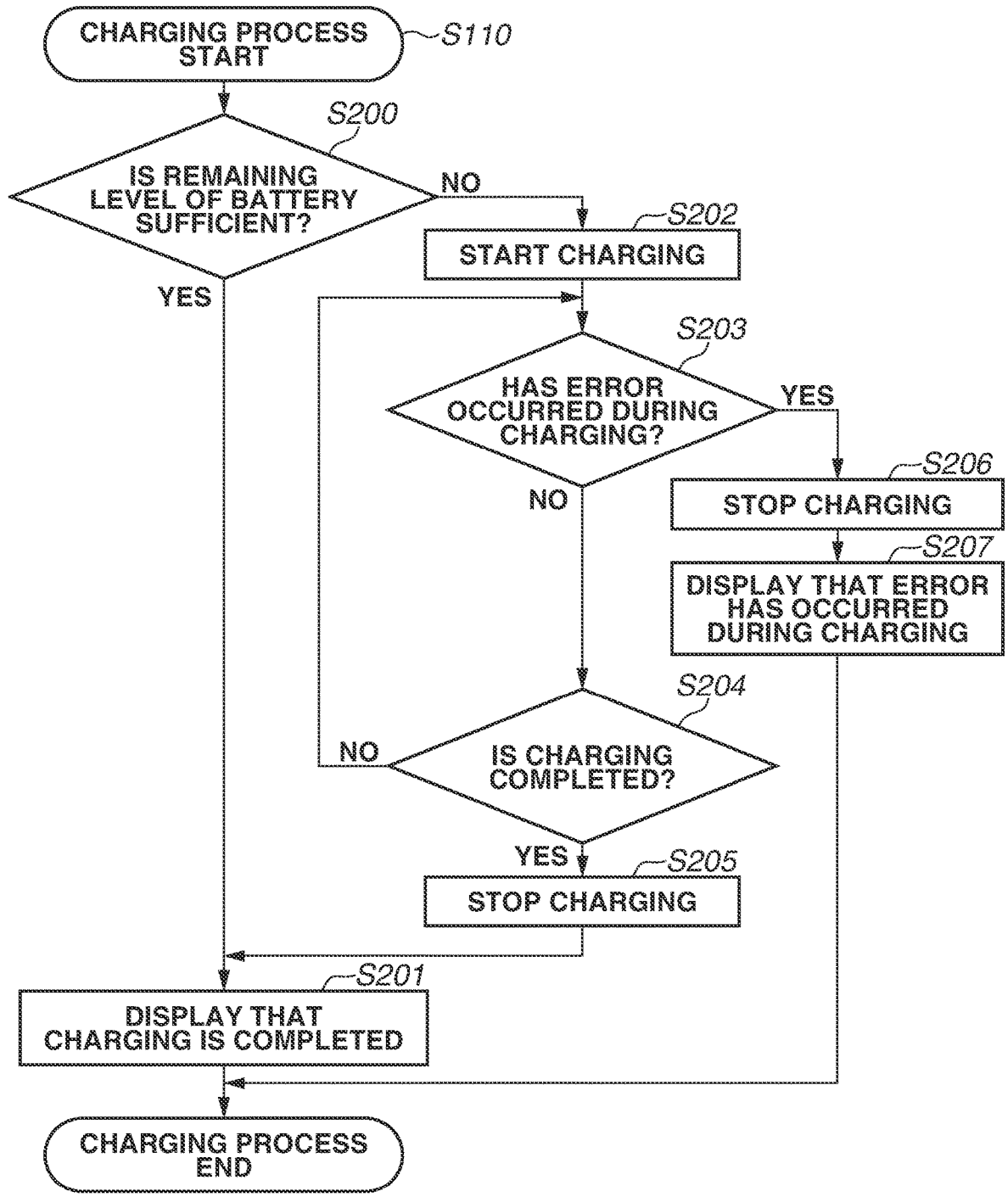
FIG. 4B is a flowchart illustrating an a example of a charging process of the image capturing apparatus 100.

In step S110, the control unit 120 performs a charging process of the flowchart illustrated in FIG. 4B. The charging process is a process in which the control unit 120 controls charging of the battery 108 with power supplied from the external device connected to the USB connector 101.

Next, the charging process of the image capturing apparatus 100 will be described with reference to FIG. 4B. FIG. 4B is a flowchart illustrating an example of the charging process of the image capturing apparatus 100.

In step S200, the control unit 120 determines whether the remaining level of the battery 108 connected to the battery holder 107 of the image capturing apparatus 100 is sufficient. For example, the control unit 120 measures the voltage of the battery 108 and obtains the remaining level of the battery 108 from the measured voltage. A microcomputer included in the battery 108 may measure the remaining level of the battery 108, and the control unit 120 may communicate with the microcomputer included in the battery 108 to obtain the remaining level of the battery 108. If the obtained remaining level is higher than or equal to a predetermined value, the control unit 120 determines that the remaining level of the battery 108 is sufficient. If the control unit 120 determines that the remaining level of the battery 108 connected to the image capturing apparatus 100 is sufficient (YES in step S200), the processing proceeds to step S201. If the control unit 120 determines that the remaining level is not sufficient (NO in step S200), the processing proceeds to step S202.

In step S201, the control unit 120 controls displaying to indicate completion of charging on the display unit 112. FIG. 6C illustrates an example of the screen displayed on the display units 112a and 112b in step S201.

In step S202, the control unit 120 controls the charging circuit 121 to start charging the battery 108 with power supplied from the external device connected to the USB connector 101, such as the adaptor 300. The charging circuit 121 charges the battery 108 based on the control of the control unit 120. In step S202, the control unit 120 also controls displaying of a charging in-process state on the display unit 112. FIG. 6A illustrates an example of the screen displayed on the display units 112a and 112b in step S202.

In step S203, the control unit 120 determines whether an error has occurred during the charging of the battery 108. The control unit 120 determines whether an error has occurred during the charging of the battery 108 based on at least any one of a charging voltage, a charging current, and a temperature of the battery 108. The charging voltage refers to the voltage of the battery 108. The charging current refers to the current to the battery 108. Alternatively, a microcomputer included in the battery 108 may obtain the charging voltage and/or the charging current. The control unit 120 may communicate with the microcomputer included in the battery 108 to obtain information such as the charging voltage and the charging current, and determine whether an error has occurred during the charging of the battery 108. If the control unit 120 determines that an error has occurred during the charging of the battery 108 (YES in step S203), the processing proceeds to step S206. If the control unit 120 determines that no error has occurred during the charging of the battery 108 (NO in step S203), the processing proceeds to step S204.

In step S204, the control unit 120 determines whether the charging of the battery 108 is completed. For example, the control unit 120 obtains the current flowing through the charging circuit 121 as the charging current. If the charging current falls to or below a predetermined current value, the control unit 120 determines that the charging of the battery 108 is completed. Alternatively, a microcomputer included in the battery 108 may measure the charging current, and the control unit 120 may communicate with the microcomputer included in the battery 108 to obtain the charging current. If the control unit 120 determines that the charging of the battery 108 is completed (YES in step S204), the processing proceeds to step S205. If the control unit 120 determines that the charging of the battery 108 is not completed (NO in step S204), the processing proceeds to step S203.

In steps S205 and S206, the control unit 120 stops charging the battery 108 by controlling the charging circuit 121.

In step S207, the control unit 120 controls displaying of an error occurred during charging on the display unit 112. FIG. 6E illustrates an example of the screen displayed on the display units 112a and 112b in step S207.

Next, a control process of the battery grip 200 will be described with reference to FIG. 5A. FIG. 5A is a flowchart illustrating an example of the control process of the battery grip 200. The control process of the battery grip 200 includes processing in the case where charging is performed with the battery grip 200 alone and processing in the case where the image capturing apparatus 100 is connected to the battery grip 200.

In step S300, the control unit 220 obtains the detection signal indicating the result of the detection performed by the detection circuit 217, and determines whether the image capturing apparatus 100 is connected to the connection unit 216 of the battery grip 200 based on the detection signal. If the control unit 220 determines that the image capturing apparatus 100 is connected to the connection unit 216 of the battery grip 200 (YES in step S300), the processing proceeds to step S301. If the control unit 220 determines that the image capturing apparatus 100 is not connected to the connection unit 216 of the battery grip 200 (NO in step S300), the processing proceeds to step S304.

In step S301, the control unit 220 controls supplying of power to the image capturing apparatus 100 by turning on the power switch 218. For example, if an external device is connected to the USB connector 201, the control unit 220 performs control in such a manner that power from the external device is supplied to the image capturing apparatus 100 by turning on the power switch 218. If no external device is connected to the USB connector 201, the control unit 220 performs control in such a manner that power from the batteries 210 and 211 connected to the battery grip 200 is supplied to the image capturing apparatus 100 by turning on the power switch 218.

In step S302, the control unit 220 determines whether an external apparatus (such as the adaptor 300 or the PC 400) is connected to the USB connector 201 based on the detection signal from the detection circuit 212. If the control unit 220 determines that an external device is connected to the USB connector 201 (YES in step S302), the processing proceeds to step S303. If the control unit 220 determines that no external device is connected to the USB connector 101 (NO in step S302), the flowchart of FIG. 5A ends.

Figure 5B:
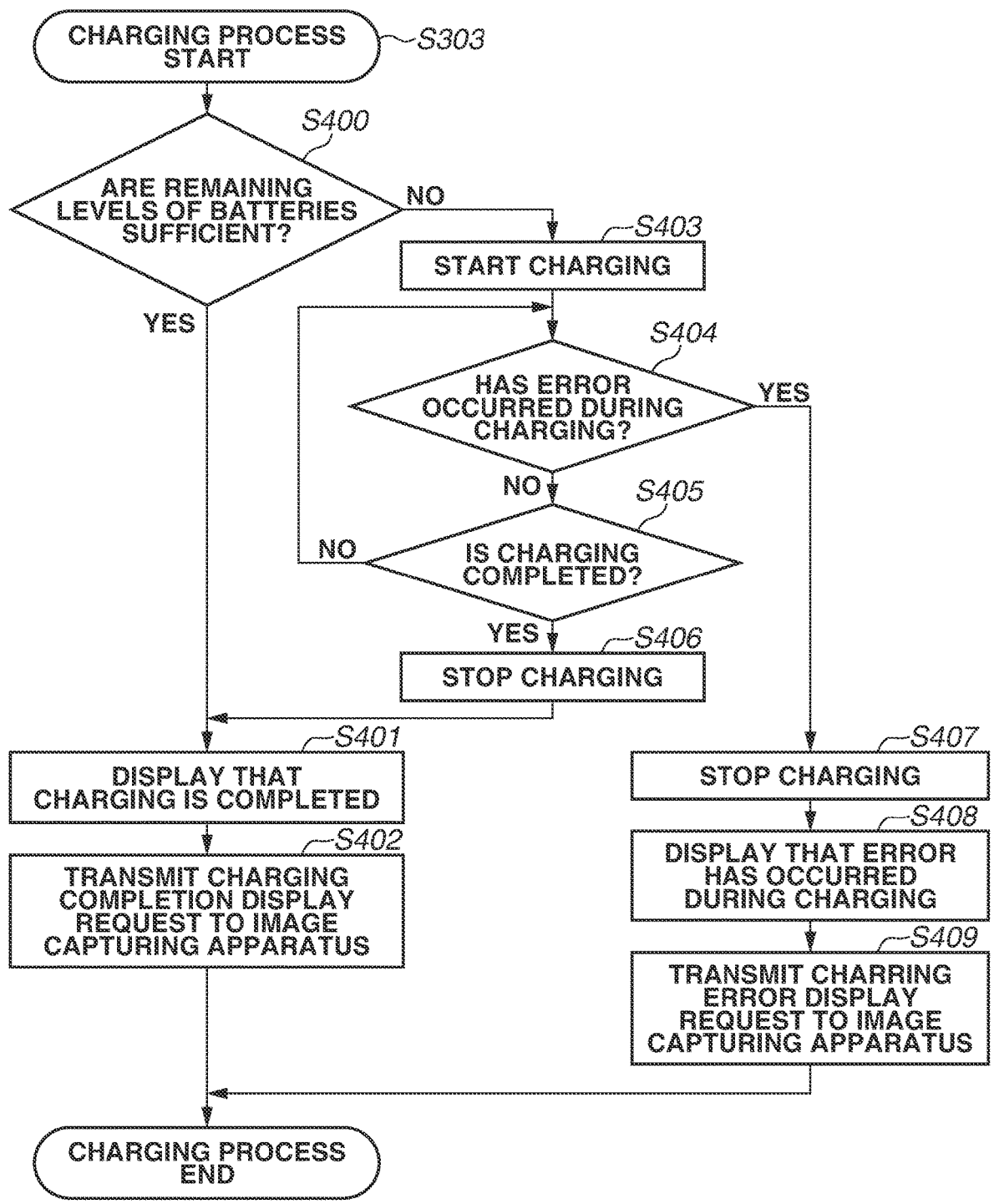
FIG. 5B is a flowchart illustrating an example of a charging process of the battery grip 200.

In step S303, the control unit 220 performs a charging process of FIG. 5B. The charging process is a process in which the control unit 220 controls charging of the batteries 210 and 211 with power supplied from the external device connected to the USB connector 201.

In step S304, the control unit 220 performs control in such a manner that no voltage is applied to the terminal of the connection unit 216 by turning off the power switch 218. If the battery grip 200 does not include the power switch 218, the control unit 220 omits the process of steps S301 and S304.

Next, the charging process of the battery grip 200 will be described with reference to FIG. 5B. FIG. 5B is a flowchart illustrating an example of the charging process of the battery grip 200.

In step S400, the control unit 220 determines whether the remaining levels of the batteries 210 and 211 connected to the battery grip 200 are sufficient. For example, the control unit 220 measures the voltages of the batteries 210 and 211 and obtains the remaining levels of the batteries 210 and 211 from the measured voltages. Alternatively, microcomputers included in the batteries 210 and 211 may measure the remaining levels of the batteries 210 and 211. The control unit 220 may communicate with the microcomputers included in the batteries 210 and 211 to obtain the remaining levels of the batteries 210 and 211. If the remaining levels of the batteries 210 and 211 are higher than or equal to a predetermined value, the control unit 220 determines that the remaining levels of the batteries 210 and 211 are sufficient. If the control unit 220 determines that the obtained remaining levels of the batteries 210 and 211 are sufficient (YES in step S400), the processing proceeds to step S401. If the control unit 220 determines that the remaining levels are not sufficient (NO in step S400), the processing proceeds to step S403.

In step S401, the control unit 220 controls displaying indicating that the charging is completed, using a message "FULL", for example, on the display unit 214. If the control unit 220 determines that the remaining levels of the batteries 210 and 211 are sufficient in step S400, the battery grip 200 will not charge the batteries 210 and 211. In such a case, the battery grip 200 displays that the charging is completed, with a message "FULL", for example, on the display unit 214 to notify the user that the remaining levels of the batteries 210 and 211 are sufficient.

In step S402, the control unit 220 controls displaying indicating that the batteries 210 and 211 connected to the battery grip 200 are in a charging completion state on the display unit 112 of the image capturing apparatus 100 by transmitting a charging completion display request to the image capturing apparatus 100. The display request is transmitted via the connection unit 216. While the charging completion state is displayed by the display unit 214 that includes simple display units, such as an LED, in step S401, a more user-friendly display is provided in step S402 by using the display unit 112 of the image capturing apparatus 100.

Receiving the display request transmitted in step S402, the control unit 120 of the image capturing apparatus 100 controls displaying indicating that the charging of the battery grip 200 is completed on the display unit 112 based on the received display request, in step S105 of FIG. 4A. FIG. 6D illustrates an example of the screen displayed on the display units 112a and 112b by the control of the control unit 120.

In step S403, the control unit 220 controls the charging circuit 221 to start charging the batteries 210 and 211 with power supplied from the external device connected to the USB connector 201, such as the adaptor 300. The charging circuit 221 charges the batteries 210 and 211 based on the control of the control unit 220.

In step S403, the control unit 220 control displaying indicating that the batteries 210 and 211 of the battery grip 200 are being charged on the display unit 214.

In step S403, the control unit 220 may also perform control in such a manner that the image capturing apparatus 100 displays that the batteries 210 and 211 are being charged, on the display unit 112 of the image capturing apparatus 100 by transmitting a request to the image capturing apparatus 100. Receiving the request, the control unit 120 of the image capturing apparatus 100 controls displaying indicating that the batteries 210 and 211 of the battery grip 200 are being charged, on the display unit 112 based on the request, in step S105 of FIG. 4A. FIG. 6B illustrates an example of the screen displayed on the display units 112a and 112b by the control of the control unit 120.

In step S404, the control unit 220 determines whether an error has occurred during the charging of the batteries 210 and 211. The control unit 220 determines whether an error has occurred during the charging of the batteries 210 and 211 based on at least any one of charging voltages, charging currents, and temperatures of the batteries 210 and 211. The charging voltages refer to the voltages of the batteries 210 and 211. The charging currents refer to the currents to the batteries 210 and 211. Alternatively, microcomputers included in the batteries 210 and 211 may obtain the charging voltages and/or the charging currents. The control unit 220 may communicate with the microcomputers included in the batteries 210 and 211 to obtain information about the charging voltages and/or the charging currents, and determine whether an error has occurred during the charging of the batteries 210 and 211. If the control unit 220 determines that an error is has occurred during the charging of the batteries 210 and 211 (YES in step S404), the processing proceeds to step S407. If the control unit 220 determines that no error has occurred during the charging of the batteries 210 and 211 (NO in step S404), the processing proceeds to step S405.

In step S405, the control unit 220 determines whether the charging of the batteries 210 and 211 is completed. For example, the control unit 220 obtains the current flowing through the charging circuit 221 as the charging currents. If the charging currents fall to or below a predetermined current value, the control unit 220 determines that the charging of the batteries 210 and 211 is completed. Alternatively, microcomputers included in the batteries 210 and 211 may measure the charging currents, and the control unit 220 may communicate with the microcomputers included in the batteries 210 and 211 to obtain the charging currents. If the control unit 220 determines that the charging of the batteries 210 and 211 is completed (YES in step S405), the processing proceeds to step S406. If the control unit 220 determines that the charging of at least either one of the batteries 210 and 211 is not completed (NO in step S405), the processing proceeds to step S404.

In steps S406 and S407, the control unit 220 controls the charging circuit 221 to stop charging the batteries 210 and 211.

In step S408, the control unit 220 controls displaying indicating that an error has occurred during charging on the display unit 214.

In step S409, the control unit 220 performs control in such a manner that the display unit 112 of the image capturing apparatus 100 displays that an error has occurred during the charging of the batteries 210 and 211 connected to the battery grip 200, by transmitting a request to the image capturing apparatus 100. While the occurrence of the error is displayed by the display unit 214 that includes simple display units, such as an LED, in step S408, a user-friendly display is provided in step S409 by using the display unit 112 of the image capturing apparatus 100.

Receiving the request transmitted in step S409, the control unit 120 of the image capturing apparatus 100 controls displaying indicating that an error has occurred during the charging of the battery grip 200 on the display unit 112 based on the received display request, in step S105 of FIG. 4A. FIG. 6F illustrates an example of the screen displayed on the display units 112a and 112b by the control of the control unit 120.

The processing performed by the control unit 220 in steps S402 and S409 is an example of a first display control process by the battery grip 200.

According to the first exemplary embodiment described above, if the image capturing apparatus 100 and the battery grip 200 are connected, the image capturing apparatus 100 does not charge the batteries 210 and 211 connected to the battery grip 200 with power supplied from an external device connected to the USB connector 101. The battery grip 200 supplies power to the image capturing apparatus 100 and charges the batteries 210 and 211 connected to the battery grip 200 by using power supplied from an external device connected to the USB connector 201. This can reduce the charging path in length, compared to a case in which the external device connected to the USB connector 101 of the image capturing apparatus 100 charges the batteries 210 and 211 connected to the battery grip 200 via the image capturing apparatus 100. Since the power supply path is appropriately controlled, the charging efficiency can be improved.

The batteries 210 and 211 are charged with power supplied from the USB connector 201 of the battery grip 200. The batteries 210 and 211 connected to the battery grip 200 are not charged with power supplied from the image capturing apparatus 100. The hardware configuration and firmware control of the image capturing apparatus 100 and the battery grip 200 can thus be simplified, compared to the case in which the batteries 210 and 211 can be charged by using the power supplied from the image capturing apparatus 100.

According to the present exemplary embodiment, the battery 108 of the image capturing apparatus 100 can be charged by the image capturing apparatus 100. According to the present exemplary embodiment, the batteries 210 and 211 of the battery grip 200 can also be charged by the battery grip 200.

Although the display unit 214 of the battery grip 200 includes inexpensive display members, such as an LED, the connection with the image capturing apparatus 100 enables display using the display unit 112 of the image capturing apparatus 100. A user-friendly display can thus be provided.

Second Exemplary Embodiment

Next, a second exemplary embodiment will be described. In the second exemplary embodiment, a description of similarities to the first exemplary embodiment will be omitted, and differences from the first exemplary embodiment will be described. Similar elements to those of the first exemplary embodiment are designated by the same reference numerals. A detailed description thereof will be omitted.

Figure 7:
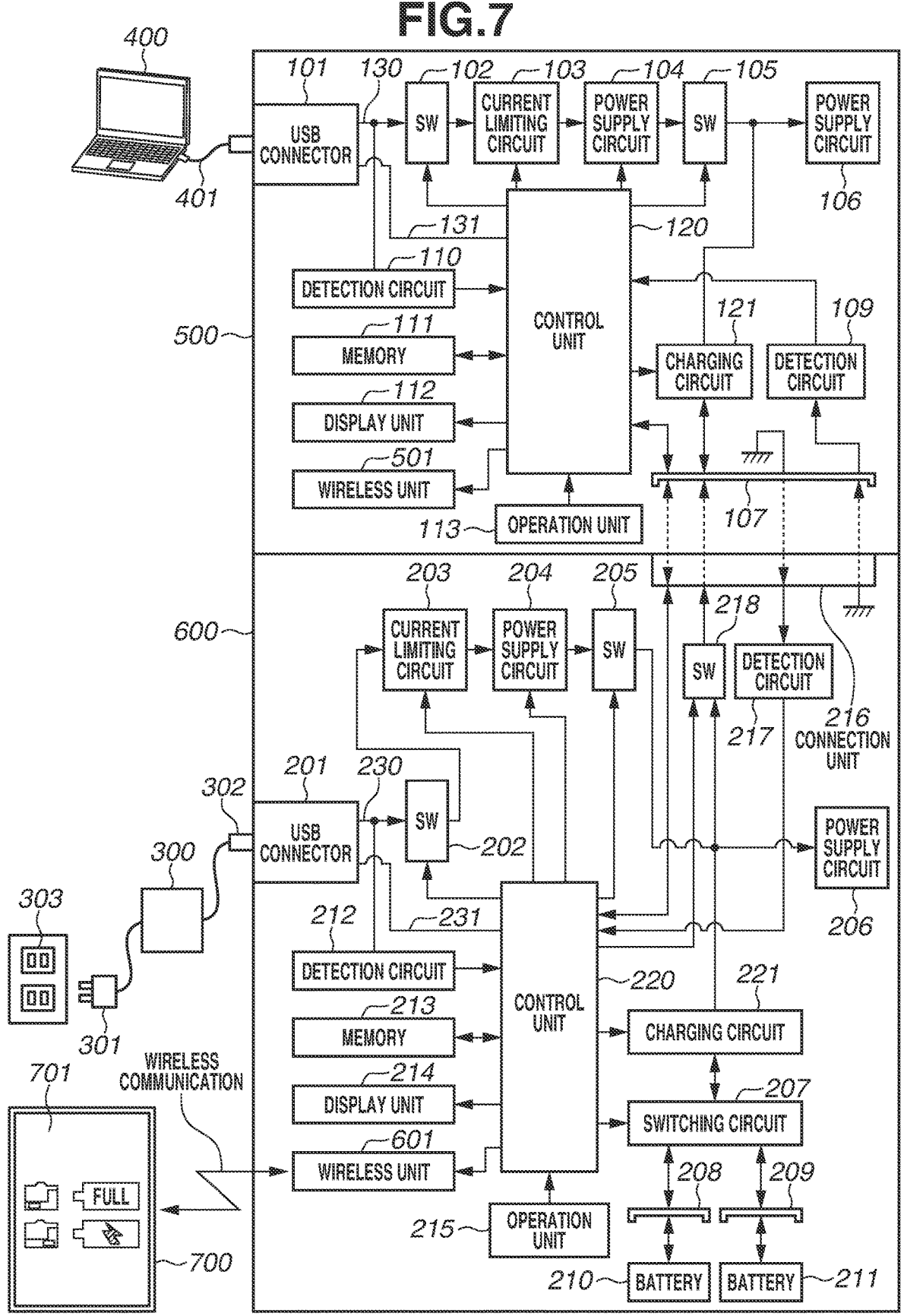
FIG. 7 is a diagram illustrating an example of a hardware configuration of an image capturing apparatus 100 and a battery grip 200.

An image capturing apparatus 500, a battery grip 600, and other devices will initially be described with reference to FIG. 7. FIG. 7 is a diagram illustrating an example of a hardware configuration of the image capturing apparatus 500 and the battery grip 600. FIG. 7 illustrates a state where the image capturing apparatus 500 and the battery grip 600 are connected to each other. FIG. 7 illustrates a state where the PC 400 is connected to the USB connector 101 of the image capturing apparatus 500 and the adaptor 300 is connected to the USB connector 201 of the battery grip 600. The AC plug 301 of the adaptor 300 is connected to the commercial power source 303. The image capturing apparatus 500, the battery grip 600, and the other devices are all electronic devices.

The image capturing apparatus 500 includes the components of the image capturing apparatus 100 according to the first exemplary embodiment and a wireless unit 501. The wireless unit 501 performs wireless communication, such as Bluetooth®, or near field communication (NFC). The image capturing apparatus 500 can communicate with a display device 700 using the wireless unit 501. The display device 700 is an external device having a wireless function. Examples of the external device include a smartphone, a PC, and a tablet. The display device 700 includes a display unit 701. The display unit 701 includes a TFT liquid crystal panel or an organic EL panel, and can display images and information.

The image capturing apparatus 500 can exchange image data with the display device 700 via the wireless unit 501. The image capturing apparatus 500 can further transmit information to the display device 700 via the wireless unit 501 and display the information on the display unit 701 of the display device 700. Examples of the information include the state of the battery 108 connected to the image capturing apparatus 500, the imaging mode, the imaging settings, and an LV image.

The battery grip 600 includes the components of the battery grip 200 according to the first exemplary embodiment and a wireless unit 601. The wireless unit 601 has a similar function to that of the wireless unit 501 of the image capturing apparatus 500, and performs wireless communication, such as Wi-Fi, Bluetooth®, or NFC. The battery grip 600 can communicate with the display device 700 using the wireless unit 601.

The battery grip 600 can exchange image data with the display device 700 via the wireless unit 601. The control unit 220 of the battery grip 600 further transmits information to the display device 700 via the wireless unit 601 and controls displaying of the information on the display unit 701 of the display device 700. Examples of the information include the state of the batteries 210 and 211 connected to the battery grip 600. For example, the control unit 220 of the battery grip 600 controls displaying of the state of the batteries 210 and 211 connected to the battery grip 600 on the display device 700 by transmitting a display request to the display device 700 in steps S402 and S408 of FIG. 5B. The control of the control unit 220 is an example of a second display control process of the battery grip 600.

FIG. 7 illustrates an example where the battery grip 600 performs wireless communication with the display device 700 via the wireless unit 601, and the display device 700 displays the state of the batteries 210 and 211 connected to the battery grip 600. Alternatively, the image capturing apparatus 500 and the battery grip 600 may operate as follows: The control unit 220 of the battery grip 600 initially transmits a first display request to the image capturing apparatus 500 via the connection unit 216. The first display request includes the information indicating the state of the batteries 210 and 211 connected to the battery grip 600. Receiving the first display request, the control unit 120 of the image capturing apparatus 500 then transmits a second display request to the display device 700 by wireless communication. The control unit 120 thus displays at least either the state of the batteries 210 and 211 connected to the battery grip 600 or the state of the battery 108 connected to the image capturing apparatus 500 on the display device 700. In this case, the battery grip 600 does not need to include the wireless unit 601. The control of the control unit 120 described here is an example of a second display control process by the image capturing apparatus 500.

If the image capturing apparatus 500 is charging the battery 108, the control unit 120 of the image capturing apparatus 500 may control the display device 700 to display the state of the battery 108 connected to the image capturing apparatus 500 by transmitting a display request to the display device 700 via the wireless unit 501.

In FIG. 7, an example where the image capturing apparatus 500 or the battery grip 600 performs wireless communication with the display device 700 and the display device 700 displays the state of charge of the image capturing apparatus 500 and the battery grip 600 on the display unit 701 has been described. Alternatively, the image capturing apparatus 500 or the battery grip 600 may communicate with the display device 700 in a wired manner.

According to the second exemplary embodiment described above, in addition to the effect of the first exemplary embodiment, a user-friendly display can be provided, also in the case where the image capturing apparatus 500 or the battery grip 600 does not include a display unit such as a liquid crystal display. This enhances convenience since the user can see the state of charge by using the display device 700, also in situations where the display unit 112 of the image capturing apparatus 500 is not usable.

The battery grip 600 is not limited to the configuration capable of connecting two batteries. The battery grip 600 may have a configuration in which one battery or more than two batteries can be connected.

Third Exemplary Embodiment

Various functions, processes, or methods described in the first and second exemplary embodiments can also be implemented by a PC, a microcomputer, a CPU, or a processor using a program. In a third exemplary embodiment, a PC, a microcomputer, a CPU, or a processor will hereinafter be referred to as a "computer X". In the third exemplary embodiment, a program for controlling the computer X and implementing various functions, processes, or methods described in the first and second exemplary embodiments will be referred to as a "program Y".

Various functions, processes, or methods described in the first and second exemplary embodiments are implemented by the computer X executing the program Y. Here, the program Y is supplied to the computer X via a computer-readable storage medium. The computer-readable storage medium according to the third exemplary embodiment includes at least one of a hard disk drive, a magnetic storage device, an optical storage device, a magneto-optical storage device, a memory card, a volatile memory, and a nonvolatile memory. The computer-readable storage device according to the third exemplary embodiment is a non-transitory storage medium.

Other Embodiments

Embodiment(s) of the present invention can also be realized by a computer of a system or apparatus that reads out and executes computer executable instructions (e.g., one or more programs) recorded on a storage medium (which may also be referred to more fully as a 'non-transitory computer-readable storage medium') to perform the functions of one or more of the above-described embodiment(s) and/or that includes one or more circuits (e.g., application specific integrated circuit (ASIC)) for performing the functions of one or more of the above-described embodiment(s), and by a method performed by the computer of the system or apparatus by, for example, reading out and executing the computer executable instructions from the storage medium to perform the functions of one or more of the above-described embodiment(s) and/or controlling the one or more circuits to perform the functions of one or more of the above-described embodiment(s). The computer may comprise one or more processors (e.g., central processing unit (CPU), micro processing unit (MPU)) and may include a network of separate computers or separate processors to read out and execute the computer executable instructions. The computer executable instructions may be provided to the computer, for example, from a network or the storage medium. The storage medium may include, for example, one or more of a hard disk, a random-access memory (RAM), a read only memory (ROM), a storage of distributed computing systems, an optical disk (such as a compact disc (CD), digital versatile disc (DVD), or Blu-ray Disc (BD)™), a flash memory device, a memory card, and the like.

While aspects of the disclosure are described with reference to exemplary embodiments, it is to be understood that the aspects of the disclosure are not limited to the exemplary embodiments. The scope of the following claims is to be accorded the broadest interpretation so as to encompass all modifications and equivalent structures.

This application claims priority from Japanese Patent Application No. 2018-185441, filed Sep. 28, 2018, which is hereby incorporated by reference herein in its entirety.

What is claimed is:

1. An electronic device comprising:
    a first connection unit connectable to a first external device;
    a second connection unit connectable to a second external device; and
    a control unit that determines whether the first external device is connected to the first connection unit,
    wherein the control unit prevents charging of a first battery connected to the first external device with power supplied from the second external device connected to the second connection unit, in a case where the first external device is connected to the first connection unit, the second external device is connected to the second connection unit, and a second battery is not connected to the first connection unit, and
    wherein the control unit allows charging of the second battery connected to the first connection unit with power supplied from the second external device connected to the second connection unit, in a case where the first external device is not connected to the first connection unit, the second external device is connected to the second connection unit, and the second battery is connected to the first connection unit.

2. The electronic device according to claim 1, wherein the control unit controls a current flowing from the second external device to the second connection unit to prevent charging of the first battery connected to the first external device with power supplied from the second external device connected to the second connection unit.

3. The electronic device according to claim 1, wherein the control unit cuts off power supplied from the second external device connected to the second connection unit to prevent charging of the first battery connected to the first external device with power supplied from the second external device connected to the second connection unit.

4. The electronic device according to claim 1, wherein the control unit causes the electronic device to operate with power supplied from the first external device, in a case where the first external device is connected to the first connection unit.

5. The electronic device according to claim 1, wherein the electronic device includes a display unit, and
    wherein information relating to a state of the first battery connected to the first external device is displayed on the display unit, in a case where the first external device is connected to the first connection unit.

6. The electronic device according to claim 1, wherein the electronic device communicates with a display device of displaying information relating to a state of the first battery connected to the first external device.

7. The electronic device according to claim 1, wherein the electronic device includes a display unit, and
    wherein information indicating that charging of the first battery connected to the first external device is not available is displayed on the display unit, in a case where the first external device is connected to the first connection unit, the second external device is connected to the second connection unit, and the second battery is not connected to the first connection unit.

8. The electronic device according to claim 1, wherein the electronic device is an image capturing apparatus.

9. The electronic device according to claim 1, wherein the first external device is an accessory of the electronic device.

10. The electronic device according to claim 1, wherein the second external device is an adaptor that supplies power to the electronic device.

11. A method of controlling an electronic device including a first connection unit connectable to a first external device and a second connection unit connectable to a second external device, the method comprising:
 determining whether the first external device is connected to the first connection unit;
 preventing charging of a first battery connected to the first external device with power supplied from the second external device connected to the second connection unit, in a case where the first external device is connected to the first connection unit, the second external device is connected to the second connection unit, and a second battery is not connected to the first connection unit; and
 allowing charging of the second battery connected to the first connection unit with power supplied from the second external device connected to the second connection unit, in a case where the first external device is not connected to the first connection unit, the second external device is connected to the second connection unit, and the second battery is connected to the first connection unit.

12. A non-transitory storage medium that stores a program for causing a computer to perform a method of controlling an electronic device including a first connection unit connectable to a first external device and a second connection unit connectable to a second external device, the method comprising:
 determining whether the first external device is connected to the first connection unit;
 preventing charging of a first battery connected to the first external device with power supplied from the second external device connected to the second connection unit, in a case where the first external device is connected to the first connection unit, the second external device is connected to the second connection unit, and a second battery is not connected to the first connection unit; and
 allowing charging of the second battery connected to the first connection unit with power supplied from the second external device connected to the second connection unit, in a case where the first external device is not connected to the first connection unit, the second external device is connected to the second connection unit, and the second battery is connected to the first connection unit.

13. The method according to claim 11, further comprising controlling a current flowing from the second external device to the second connection unit to prevent charging of the first battery connected to the first external device with power supplied from the second external device connected to the second connection unit.

14. The method according to claim 11, further comprising cutting off power supplied from the second external device connected to the second connection unit to prevent charging of the first battery connected to the first external device with power supplied from the second external device connected to the second connection unit.

15. The method according to claim 11, further comprising causing the electronic device to operate with power supplied from the first external device, in a case where the first external device is connected to the first connection unit.

16. The method according to claim 11, further comprising displaying information relating to a state of the first battery connected to the first external device on a display unit of the electronic device, in a case where the first external device is connected to the first connection unit.

17. The method according to claim 11, further comprising communicating with a display device to enable displaying of information relating to a state of the first battery connected to the first external device.

18. The method according to claim 11, further comprising displaying information indicating that charging of the first battery connected to the first external device is not available on a display unit of the electronic device, in a case where the first external device is connected to the first connection unit, the second external device is connected to the second connection unit, and the second battery is not connected to the first connection unit.

* * * * *